US008681429B2

(12) United States Patent
Liu et al.

(10) Patent No.: US 8,681,429 B2
(45) Date of Patent: Mar. 25, 2014

(54) METAMATERIAL FOR CONVERGING ELECTROMAGNETIC WAVES

(75) Inventors: Ruopeng Liu, Guangdong (CN); Chunlin Ji, Guangdong (CN); Jinjin Wang, Guangdong (CN)

(73) Assignees: Kuang-Chi Innovative Technology Ltd., Fu Tian District, Shenzhen, Guangdong; Kuang-Chi Institute of Advanced Technology, Nanshan District, Shenzhen, Guangdong (CN)

( * ) Notice: Subject to any disclaimer, the term of this patent is extended or adjusted under 35 U.S.C. 154(b) by 29 days.

(21) Appl. No.: 13/522,493

(22) PCT Filed: Nov. 17, 2011

(86) PCT No.: PCT/CN2011/082387
§ 371 (c)(1),
(2), (4) Date: Jul. 16, 2012

(87) PCT Pub. No.: WO2012/139379
PCT Pub. Date: Oct. 18, 2012

(65) Prior Publication Data
US 2012/0299670 A1   Nov. 29, 2012

(30) Foreign Application Priority Data

Apr. 12, 2011   (CN) .......................... 2011 1 0091322

(51) Int. Cl.
*G02B 3/00*   (2006.01)
(52) U.S. Cl.
USPC ............................ 359/642; 359/652; 359/653

(58) Field of Classification Search
USPC ........................................ 359/652–654, 724
See application file for complete search history.

(56) References Cited

U.S. PATENT DOCUMENTS

| | | | |
|---|---|---|---|
| 2007/0188385 A1* | 8/2007 | Hyde et al. | 343/700 MS |
| 2008/0165079 A1* | 7/2008 | Smith et al. | 343/911 R |
| 2009/0109516 A1* | 4/2009 | Wang et al. | 359/290 |
| 2009/0190231 A1* | 7/2009 | Lenchenkov | 359/654 |
| 2009/0201572 A1* | 8/2009 | Yonak | 359/316 |
| 2010/0134215 A1* | 6/2010 | Lee et al. | 333/235 |
| 2011/0069377 A1* | 3/2011 | Wu et al. | 359/356 |

* cited by examiner

*Primary Examiner* — Ricky Mack
*Assistant Examiner* — William Alexander
(74) *Attorney, Agent, or Firm* — Winston Hsu; Scott Margo

(57) ABSTRACT

The present disclosure relates to a metamaterial for converging electromagnetic waves, which comprises a plurality of metamaterial sheet layers stacked integrally in an x direction. Each of the metamaterial sheet layers comprises a plurality of metamaterial units. Each of the metamaterial units has an identical substrate unit and a man-made microstructure attached on the substrate unit. The metamaterial units of each row have a same refractive index. Refractive indices of the metamaterial units of each column satisfy particular relationships. The man-made microstructure is a non-90° rotationally symmetrical structure, and an extraordinary optical axis of a refractive index ellipsoid thereof is non-perpendicular to and unparallel to the y direction. The thickness of the metamaterial can be considerably decreased while the function of converging electromagnetic waves is achieved in the present disclosure. This is favorable for making the metamaterial product miniaturized and lightweight.

14 Claims, 9 Drawing Sheets

METAMATERIAL FOR CONVERGING ELECTROMAGNETIC WAVES

FIELD OF THE INVENTION

The present disclosure generally relates to the technical field of electromagnetic communications, and more particularly, to a metamaterial for converging electromagnetic waves.

BACKGROUND OF THE INVENTION

As a new kind of material, a metamaterial is formed by a substrate made of a non-metallic material and a plurality of man-made microstructures attached on a surface of the substrate or embedded inside the substrate. The substrate may be virtually divided into a plurality of cubic substrate units arranged in a rectangular array form, with each of the substrate units being attached with one man-made microstructure to form one metamaterial unit. Correspondingly, just like a crystal which is formed by numerous crystal lattices arranged in a certain manner, the whole metamaterial consists of hundreds of or millions of or even hundreds of millions of such metamaterial units. The man-made microstructures may either be the same or not be totally the same for each of the metamaterial units. Each of the man-made microstructures is a cylindrical or flat metal wire that forms a certain geometrical pattern, for example, a metal wire that forms a circular shape, an "I" shape or the like.

Due to presence of the man-made microstructures, each of the metamaterial units presents an equivalent dielectric constant and an equivalent magnetic permeability that are different from those of the substrate. Therefore, the metamaterial comprised of all the metamaterial units exhibits special response characteristics to the electric field and the magnetic field. Meanwhile, by designing the man-made microstructures into different structures and shapes, the equivalent dielectric constant and the equivalent magnetic permeability of the metamaterial units and, consequently, the response characteristics of the whole metamaterial can be changed.

Accordingly, there is a need in the art to provide a metamaterial that can gather planar electromagnetic waves or even converge them to a point just like a lens which converges parallel light rays to a single point. Unfortunately, this need has not been satisfied in the art.

SUMMARY OF THE INVENTION

An objective of the present disclosure is to satisfy the aforesaid need by providing a metamaterial for converging electromagnetic waves.

To achieve the aforesaid objective, the present disclosure provides a metamaterial for converging electromagnetic waves, which comprises a plurality of metamaterial sheet layers stacked integrally in an x direction. Each of the metamaterial sheet layers comprises a plurality of metamaterial units. Each of the metamaterial units has an identical substrate unit and a man-made microstructure attached on the substrate unit. The metamaterial units are arranged into a first array which takes a y direction perpendicular to the x direction as a column direction and a z direction perpendicular to both the x direction and the y direction as a row direction. The metamaterial units of each row have a same refractive index. The metamaterial units of each column have refractive indices of $a_1, a_2, a_3, \ldots, a_s, b_1, b_2, b_3, \ldots, b_m, c_1, c_2, c_3, \ldots, c_p$ in sequence, and the refractive indices satisfy: $a_1 \leq a_2 \leq a_3 \ldots \leq a_s$, $c_1 \geq c_2 \geq c_3 \ldots \geq c_p$; where $b_1 < a_s$, $b_m < c_1$, s and p are both natural numbers no less than 2, and m is a natural number no less than 1. The $b_1, b_2, b_3, \ldots, b_m$ have the following relationships therebetween: $b_1 \leq b_2 \leq b_3 \ldots \leq b_q$, $b_q \geq b_{q+1} \geq b_{q+2} \geq b_{q+3} \ldots \geq b_m$, and q is a natural number that is less than m. The man-made microstructure is a non-90° rotationally symmetrical structure, the man-made microstructure is of an "I" shape or a snowflake shape, and the extraordinary light optical axis of each microstructure's refractive index ellipsoid thereof is neither perpendicular nor parallel to the y direction.

Preferably, dimensions of each of the metamaterial units in the x direction, the y direction and the z direction range between one fiftieth and a half of the wavelength of a target electromagnetic wave.

Preferably, the man-made microstructures in each column in the y direction are rotated clockwise or counterclockwise in sequence respectively from a middle metamaterial unit towards two ends of the column, and the man-made microstructures of the metamaterial units located at the two ends are rotated by no more than 90° with respect to the man-made microstructure of the middle metamaterial unit.

Preferably, clockwise rotation angles of the man-made microstructures are $\theta_1, \theta_2, \theta_3, \ldots, \theta_q$ in sequence, and have the following relationships therebetween: $\theta_1 \leq \theta_2 \leq \theta_3 \leq \ldots \leq \theta_q$.

Preferably, the man-made microstructures are made of a metal material.

To achieve the aforesaid objective, the present disclosure further provides a metamaterial for converging electromagnetic waves, which comprises a plurality of metamaterial sheet layers stacked integrally in an x direction. Each of the metamaterial sheet layers comprises a plurality of metamaterial units. Each of the metamaterial units has an identical substrate unit and a man-made microstructure attached on the substrate unit. The metamaterial units are arranged into a first array which takes a y direction perpendicular to the x direction as a column direction and a z direction perpendicular to both the x direction and the y direction as a row direction. The metamaterial units of each row have a same refractive index. The metamaterial units of each column have refractive indices of $a_1, a_2, a_3, \ldots, a_s, b_1, b_2, b_3, \ldots, b_m, c_1, c_2, c_3, \ldots, c_p$ in sequence, and the refractive indices satisfy: $a_1 \leq a_2 \leq a_3 \ldots \leq a_s$, $c_1 \geq c_2 \geq c_3 \ldots \geq c_p$; where $b_1 < a_s$, $b_m < c_1$, s and p are both natural numbers no less than 2, and m is a natural number no less than 1. The man-made microstructure is a non-90° rotationally symmetrical structure, and the extraordinary light optical axis of each microstructure's refractive index ellipsoid thereof is neither perpendicular nor parallel to the y direction.

Preferably, the $b_1, b_2, b_3, \ldots, b_m$ have the following relationships therebetween: $b_1 \leq b_2 \leq b_3 \ldots \leq b_q$, $b_q \geq b_{q+1} \geq b_{q+2} \geq b_{q+3} \ldots \geq b_m$, and q is a natural number that is less than m.

Preferably, the refractive indices of the metamaterial units of each column also have the following relationships therebetween:

$$(a_2-a_1) \geq (a_3-a_2) \ldots \geq (a_s-a_{s-1}) \geq (b_2-b_1) \geq (b_3-b_2) \ldots \geq (b_{q-1}-b_q),$$

$$(b_q-b_{q+1}) \leq (b_{q+1}-b_{q+2}) \leq (b_{q+2}-b_{q+3}) \ldots \leq (b_{m-1}-b_m) \leq (c_1-c_2) \leq (c_1-c_3) \leq (c_{p-1}-c_p).$$

Preferably, the refractive indices also have the following relationships:

$$a_1=b_1=b_m=c_p,\ a_s=b_q=c_1,\ s=p,\ q>s \text{ and } q>p,\ q=[(m+1)/2].$$

Preferably, for the man-made microstructures of the metamaterial units of each column in the y direction, the extraordinary optical axes of the respective refractive index ellipsoids are rotated in the clockwise direction sequentially, and the extraordinary optical axes of the refractive index ellipsoids of one of the rows of the man-made microstructures that has the refractive index of $b_q$ are parallel to the y direction.

Preferably, the plurality of metamaterial sheet layers are identical to each other and have the same refractive index distribution as each other.

Preferably, the plurality of metamaterial sheet layers have different refractive index distributions from each other, and for each second array formed by the metamaterial units that takes the x direction as a row direction and the y direction as a column direction, a central metamaterial unit is taken as a circle center, and refractive indices of a row of metamaterial units and a column of metamaterial units passing through the central metamaterial unit are $a_1, a_2, a_3, \ldots, a_s, b_1, b_2, b_3, \ldots, b_m, c_1, c_2, c_3, \ldots, c_p$ in sequence.

Preferably, the refractive indices of the second array are distributed in a circular form, and the refractive indices of at least some of the metamaterial units in an arbitrary straight line passing through the circle center are $a_1, a_2, a_3, \ldots, a_s, b_1, b_2, b_3, \ldots, b_m, c_1, c_2, c_3, \ldots, c_p$ in sequence.

Preferably, the man-made microstructures have substantially the same geometry but sizes thereof increase as the refractive indices increase or decrease as the refractive indices decrease.

Preferably, the man-made microstructures are of an "I" shape or a snowflake shape.

Preferably, the man-made microstructures are made of a metal material.

Preferably, the man-made microstructures in each column in the y direction are rotated clockwise or counterclockwise in sequence respectively from a middle metamaterial unit towards two ends of the column, and the man-made microstructures of the metamaterial units located at the two ends are rotated by no more than 90° with respect to the man-made microstructure of the middle metamaterial unit.

Preferably, clockwise rotation angles of the man-made microstructures are $\theta_1, \theta_2, \theta_3, \ldots, \theta_q$ in sequence, and have the following relationships therebetween:

$$\theta_1 \leq \theta_2 \leq \theta_3 \leq \ldots \leq \theta_q.$$

Preferably, dimensions of each of the metamaterial units in the x direction, the y direction and the z direction range between one fiftieth and a half of a wavelength of the electromagnetic waves.

The metamaterial for converging electromagnetic waves of the present disclosure has the following benefits: as a multi-stage refractive index distribution is adopted for the metamaterial of the present disclosure, the relative variation rate of the refractive indices is increased, so a thickness of the metamaterial can be considerably decreased while the function of converging electromagnetic waves is achieved. This is favorable for making the metamaterial product miniaturized and lightweight.

BRIEF DESCRIPTION OF THE DRAWINGS

Hereinbelow, the present disclosure will be further described with reference to the attached drawings and embodiments thereof. In the attached drawings.

DETAILED DESCRIPTION OF THE INVENTION

The present disclosure relates to a metamaterial for converging electromagnetic waves, which can achieve converging of electromagnetic waves because a special refractive index distribution is adopted. Hereinbelow, the structure and characteristics of the metamaterial will be further described with reference to FIG. 1 to FIG. 12.

Figure 1:
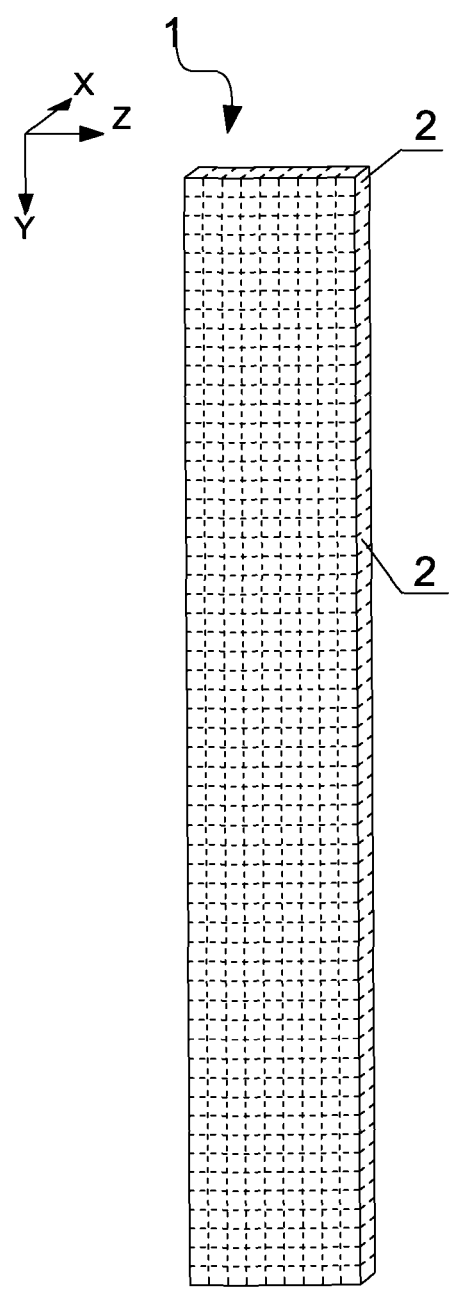
FIG. 1 is a schematic structural view of each metamaterial sheet layer.

The metamaterial for converging electromagnetic waves of the present disclosure comprises a plurality of metamaterial sheet layers 1. As shown in FIG. 1, each of the metamaterial sheet layers 1 has a front surface and a back surface parallel to each other, and thus has a uniform thickness. In the metamaterial sheet layer 1, the thickness direction is defined as an x direction, the length direction is defined as a y direction, and the width direction is defined as a z direction. The x direction, the y direction and the z direction are perpendicular to each other.

The metamaterial sheet layer 1 comprises a sheet substrate 3 that is uniform in thickness and a plurality of man-made microstructures 4 attached on the sheet substrate 3. The sheet substrate 3 is virtually divided into a plurality of identical cubic lattices. Each of the lattices is a substrate unit, and each of the substrate units is attached with one man-made microstructure 4. Then, each of the substrate units and the man-made microstructure 4 attached thereon jointly form one metamaterial unit 2. The whole metamaterial sheet layer 1 may be viewed as a first array formed by a plurality of metamaterial units 2 which takes the z direction as a row direction and the y direction as a column direction. The cubic lattices here may have dimensions that are divided arbitrarily. Preferably in the present disclosure, both lengths in the y direction and the z direction are one tenth of the wavelength of the electromagnetic waves to be converged, and the length in the x direction is equal to a thickness of the sheet substrate 3 in the x direction. Of course, for each of the metamaterial units of the present disclosure, the lengths in the x direction, the y direction and the z direction may be any value that is less than one fifth of the wavelength of the electromagnetic waves, and are preferably less than one tenth of the wavelength.

Figure 3:
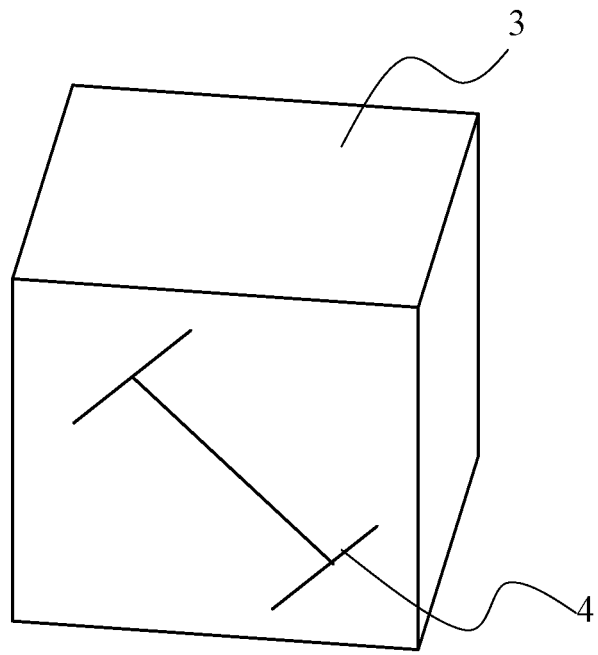
FIG. 3 is a schematic structural view of a first embodiment of a man-made microstructure.
Figure 4:
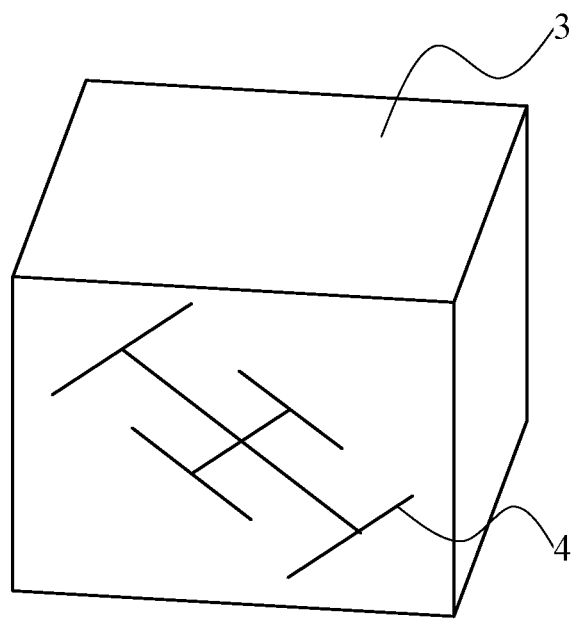
FIG. 4 is a schematic structural view of a second embodiment of the man-made microstructure.
Figure 5:
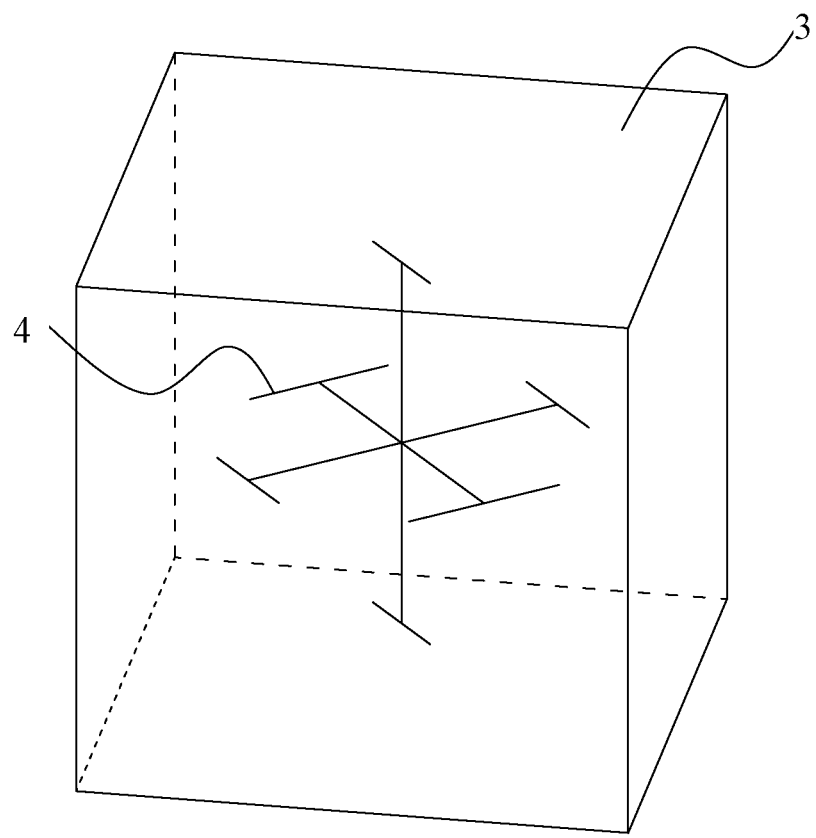
FIG. 5 is a schematic structural view of a third embodiment of the man-made microstructure.

The structure of the metamaterial unit 2 is as shown in FIG. 3, FIG. 4 and FIG. 5. The metamaterial unit 2 shown in FIG. 3 comprises a substrate unit and a man-made microstructure 4 attached on a surface of the substrate unit. The man-made microstructure 4 of this embodiment is a planar metal wire of an "I" shape, which comprises a linear first metal wire and two second metal wires that are perpendicularly connected at two ends of the first metal wire respectively. The man-made microstructure 4 shown in FIG. 4 is of a two-dimensional (2D) snowflake shape, comprising two first metal wires that perpendicularly intersect with each other in a "+" shape and four second metal wires that are perpendicularly connected at two ends of each of the first metal wires respectively. The man-made microstructure 4 shown in FIG. 5 is of a three-dimensional (3D) snowflake shape, comprising three first metal wires that perpendicularly intersect with each other at a common intersection point and six second metal wires that are perpendicularly connected at two ends of each of the first metal wires respectively. The 3D man-made microstructure 4 is attached into the substrate 3 through a certain manufacturing process.

Of course, the man-made microstructure 4 of the present disclosure may further be implemented in many shapes. Specifically, any structure that is formed by metal wires or metal lines into a certain geometrical pattern and that can change its electromagnetic properties in response to an electromagnetic field can be used as the man-made microstructure 4 of the present disclosure to be attached on a surface of the substrate 3 or embedded inside the substrate 3 to form the metamaterial unit 2 of the present disclosure.

Metamaterial units 2 having different man-made microstructures 4 exhibit different dielectric constants and different magnetic permeabilities, and thus make different electromagnetic responses to the electromagnetic waves. An important response is to change the propagating direction of the electromagnetic waves. According to the metamaterial for converging electromagnetic waves of the present disclosure, the amount of variation in the propagating direction of the electromagnetic waves propagating through each of the metamaterial units 2 can be set through design of the dielectric constant and the magnetic permeability of each of the metamaterial units 2. Then, all of the metamaterial units 2 can act together to converge all the electromagnetic waves towards one direction or even converge them to a point.

The refractive index can be used to represent the variation in the propagating direction of the electromagnetic waves. It is known that the refractive index $n=\sqrt{\mu\varepsilon}$, where $\mu$ represents the magnetic permeability and $\varepsilon$ represents the dielectric constant. As can be known from this, given a constant magnetic permeability $\mu$, a variation rule of the dielectric constant $\varepsilon$ can be derived from the variation rule of the refractive index n that is already known. Therefore, for all descriptions hereinbelow relating to the variation rule of the refractive index n, it can be understood that the variation rule of the dielectric constant can be derived in a similar way according to the aforesaid formula.

Figure 2:
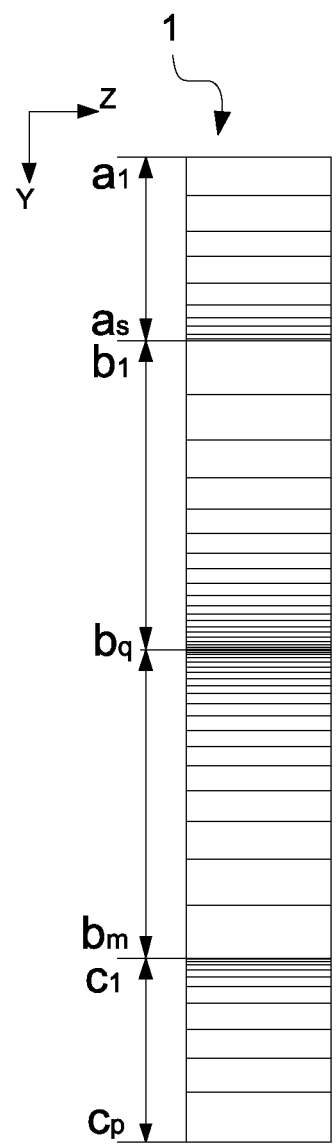
FIG. 2 is a schematic view illustrating a refractive index distribution of the metamaterial sheet layer shown in FIG. 1.

FIG. 2 illustrates a refractive index distribution of each of the metamaterial sheet layers 1. A column of metamaterial units 2 in the y direction have refractive indices of $a_1, a_2, a_3, \ldots, a_s, b_1, b_2, b_3, \ldots, b_m, c_1, c_2, c_3, \ldots, c_p$ in sequence, and the refractive indices satisfy:

$$a_1 \le a_2 \le a_3 \ldots \le a_s \quad (1)$$

$$c_1 \ge c_2 \ge c_3 \ldots \ge c_p \quad (2)$$

where $b_1 < a_s$, $b_m < c_1$, s and p are both natural numbers no less than 2, and m is a natural number no less than 1. The metamaterial units 2 of each row in the z direction have a same refractive index.

A portion of the metamaterial where the refractive indices are $a_1$ to $a_s$ is defined as a first metamaterial section 100, a portion of the metamaterial where the refractive indices are $b_1$ to $b_m$ is defined as a middle metamaterial section, and a portion of the metamaterial where the refractive indices are $c_1$ to $c_p$ is defined as a fourth metamaterial section 400.

When terms in each of the relational expressions (1) and (2) are not equal to each other simultaneously (i.e., when the refractive indices of the first metamaterial section 100 and the fourth metamaterial section 400 are distributed non-uniformly), the phase propagating direction of the electromagnetic waves will be deflected towards a direction where the refractive index is large. Therefore, an electromagnetic wave incident from the first metamaterial section 100 will be deflected towards the metamaterial units 2 having the refractive index of $a_s$ when exiting from the metamaterial; and an electromagnetic wave propagating through the fourth metamaterial section 400 will be deflected towards the metamaterial units 2 having the refractive index of $c_1$ when exiting from the metamaterial. That is, electromagnetic waves incident from two sides of the middle metamaterial section will be converged towards the middle metamaterial section when exiting from the metamaterial, thus achieving converging of the electromagnetic waves.

Further, in order to also converge the electromagnetic waves propagating through the middle metamaterial section, the refractive indices $b_1, b_2, b_3, \ldots, b_m$ of the metamaterial units 2 of each column in the middle metamaterial section have the following relationships therebetween:

$$b_1 \le b_2 \le b_3 \ldots \le b_q \quad (3)$$

$$b_q \ge b_{q+1} \ge b_{q+2} \ge b_{q+3} \ldots \ge b_m \quad (4)$$

where q is a natural number that is less than m.

A portion of the metamaterial where the refractive indices are $b_1$ to $b_q$ is defined as a second metamaterial section 200, and a portion of the metamaterial where the refractive indices are $b_q$ to $b_m$ is defined as a third metamaterial section 300.

If terms in each of the relational expressions (3) and (4) are not equal to each other simultaneously, then similar to the first metamaterial section 100 and the fourth metamaterial section, the second metamaterial section 200 and the third metamaterial section 300 can also deflect and converge the electromagnetic waves towards the row of the metamaterial units having the refractive index of $b_q$.

I) A case in which the refractive indices of the metamaterial sections are distributed non-uniformly.

When terms in each of the relational expressions (1), (2), (3) and (4) are not equal to each other simultaneously, it can be ensured that the incident electromagnetic waves are all deflected towards the row of the metamaterial units having the refractive index of $b_q$, but may not necessarily be converged to a point; and instead, the electromagnetic waves are only brought close to each other. In order to converge the electromagnetic waves to a point, the electromagnetic wave incident from a site near the metamaterial units 2 having the refractive index of $a_1$ must be deflected at a relatively large angle with respect to the incident direction when exiting, and the electromagnetic wave incident from a site near the metamaterial units having the refractive index of $b_q$ must be deflected at a relatively small angle when exiting.

As is already known, the larger the variation in refractive index between adjacent metamaterial units 2 is, the larger the deflection angle of the electromagnetic waves will be. Therefore, in order to converge all the electromagnetic waves to a point, the refractive indices of the metamaterial units of each column in the y direction also have the following relationships therebetween:

$$(a_2-a_1) \geq (a_3-a_2) \ldots \geq (a_s-a_{s-1}) \geq (b_2-b_1) \geq (b_3-b_2) \ldots \geq (b_{q-1}-b_q) \quad (5)$$

$$(b_q-b_{q+1}) \leq (b_{q+1}-b_{q+2}) \leq (b_{q+2}-b_{q+3}) \ldots \leq (b_{m-1}-b_m) \leq (c_1-c_2) \leq (c_2-c_3) \leq (c_{p-1}-c_p) \quad (6)$$

For the metamaterial satisfying the aforesaid refractive index variation relationship, the refractive index variations at two sides of the metamaterial units 2 having the refractive index of $b_q$ increase gradually towards two ends for electromagnetic waves that are incident in parallel. Therefore, taking the metamaterial units 2 having the refractive index of $b_q$ as a boundary, electromagnetic waves that are incident closer to the two ends will have larger deflection angles when exiting, and electromagnetic waves that are incident closer to the metamaterial units 2 having the refractive index of $b_q$ will have smaller deflection angles when exiting. By making the deflection angles follow a certain rule through appropriate design and calculation, the electromagnetic waves can be converged to a point. Similar to a convex lens, a corresponding surface curvature feature can be designed to achieve the converging function so long as deflection angles of surface points to light and the refractive indices of the material are known. Likewise in the present disclosure, by designing the man-made microstructure 4 of each of the metamaterial units 2, the dielectric constant $\in$ and the magnetic permeability $\mu$ of this metamaterial unit can be obtained so as to derive the refractive index n. By designing variations in the refractive index n between adjacent metamaterial units 2 in such a way that the electromagnetic waves are deflected towards a particular point, converging to a point can be achieved.

Figure 6:
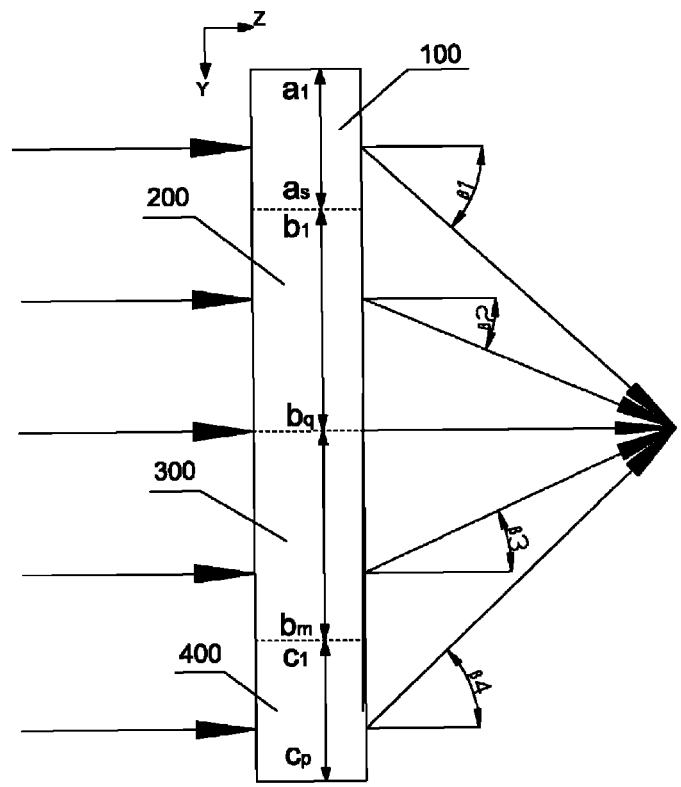
FIG. 6 is a schematic view illustrating how the metamaterial sheet layer shown in FIG. 2 converges electromagnetic waves.

For example, four electromagnetic waves shown in FIG. 6 are projected on the first metamaterial section, the second metamaterial section, the third metamaterial section and the fourth metamaterial section of the metamaterial sheet layer 1 respectively all parallel to the z direction. In order to have the electromagnetic waves deflected and converged to a point after propagating through the metamaterial sheet layer 1, deflection angles β1, β2, β3, β4 of the electromagnetic waves with respect to the z direction when exiting may be measured. According to the reference *Metamaterials: Theory, Design, and Applications* (Publisher: Springer, ISBN 1441905723, p.p. 75-76), it can be known that the refractive index variation Δn and the deflection angle β (e.g., β1, β2, β3, or β4) have the following relationships therebetween:

$$d \cdot \Delta n = \sin \beta \quad (7)$$

where d represents the length of the metamaterial sheet layer l in the z direction, and Δn represents a difference in refractive index between the metamaterial units of two adjacent rows. With d and sin β being known, Δn can be solved. By setting a refractive index base, the refractive indices of the metamaterial units of the two adjacent rows can be derived reversely. After the deflection angles at all sites are calculated, the refractive index distribution of the metamaterial sheet layer 1 in the y direction can be derived finally. After a man-made microstructure 4 is designed, the dielectric constant and the magnetic permeability thereof are obtained through calculation and simulation, and then, the shape and the dimensions of the man-made microstructure 4 are adjusted continuously until the dielectric constant and the magnetic permeability thereof satisfy the aforesaid refractive index distribution.

Further, in order to simplify the design and manufacturing processes, the third metamaterial section 300 and the fourth metamaterial section 400 of the present disclosure may be completely symmetrical in structure with the second metamaterial section 200 and the first metamaterial section 100 respectively. Then, the refractive index distribution will also be symmetrical, that is:

$$a_1=c_p, a_2=c_{p-1}, \ldots, a_{s-1}=c_2, a_s=c_1, s=p \quad (8)$$

Moreover, on the premise that the relational expression (8) is satisfied, 1) when m is an odd number, the refractive indices of the second metamaterial section 200 and the third metamaterial section 300 satisfy:

$$q=(m+1)/2, b_1=b_m, b_2=b_{m-1}, \ldots, b_{q-1}=b_{q+1} \quad (9)$$

2) when m is an even number, the refractive indices of the second metamaterial section 200 and the third metamaterial section 300 satisfy:

$$q=m/2, b_1=b_m, b_2=b_{m-1}, \ldots, b_q=b_{q+1} \quad (10)$$

The aforesaid relational expressions between q and m may also be represented as q=[(m+1)/2], and [(m+1)/2] represents an integer portion of a result of dividing m by 2.

Furthermore, for convenience of comparison, the refractive indices also have the following relationships in addition to what described above:

$$a_1=b_1=b_m=c_p, a_s=b_q=c_1, s=p, q>s \quad (11)$$

As can be known from this, each column of refractive indices of the first metamaterial section 100 have a same initial value and a same final value as each column of refractive indices of the second metamaterial section 200 in the y direction; i.e., the total refractive index variations of the two metamaterial sections are equal to each other. Because q>s (i.e., the number of the metamaterial units of each column of the first metamaterial section 100 is larger than that of the second metamaterial section 200), the average variation rate of the refractive indices of the first metamaterial section 100 is smaller than that of the second metamaterial section 200 under the condition that the total refractive index variations are equal to each other. As shown in FIG. 2, the magnitudes of the refractive indices are represented by the density of lines. A smaller density of the lines represents a larger refractive index, and a larger density variation represents a larger variation rate of the refractive indices.

Figure 8:
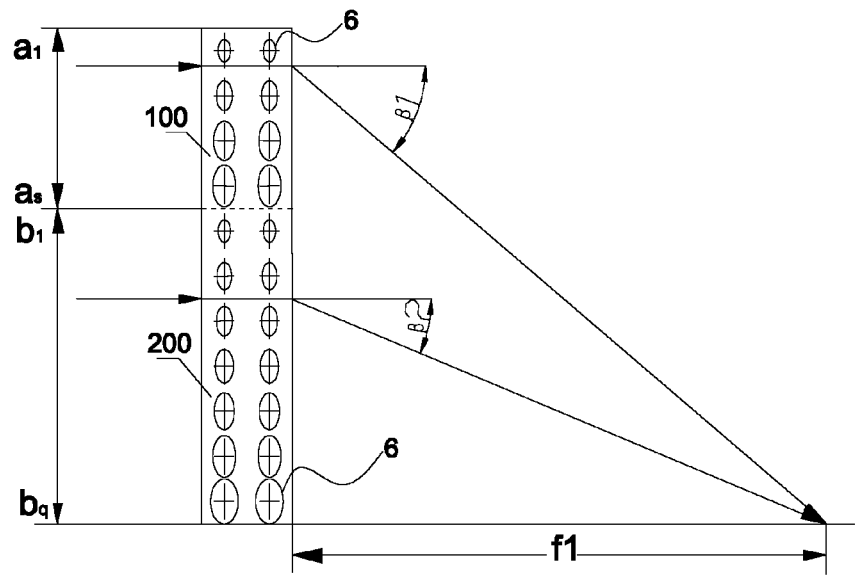
FIG. 8 is a schematic view illustrating propagation of the electromagnetic waves when major axes of electromagnetic wave propagating ellipsoids are parallel to a y direction.
Figure 9:
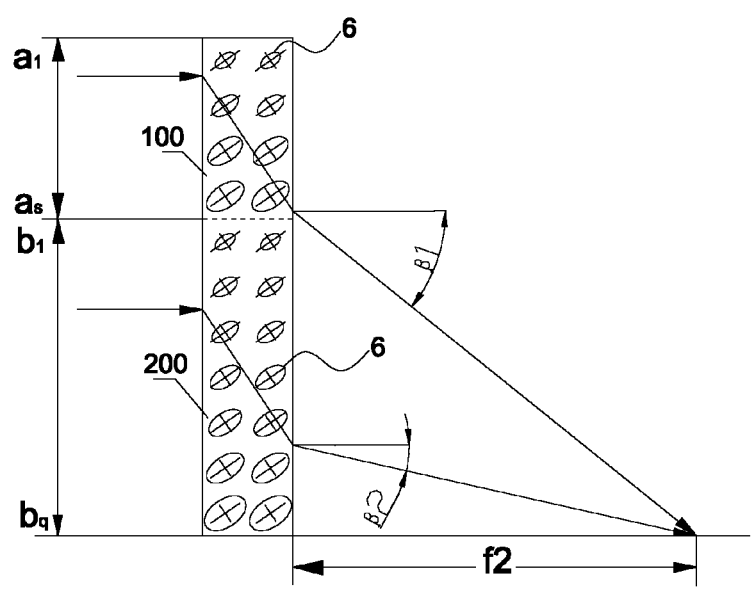
FIG. 9 is a schematic view illustrating propagation of the electromagnetic waves when the major axes of the electromagnetic wave propagating ellipsoids are all oblique at a certain angle with respect to the y direction.
Figure 10:
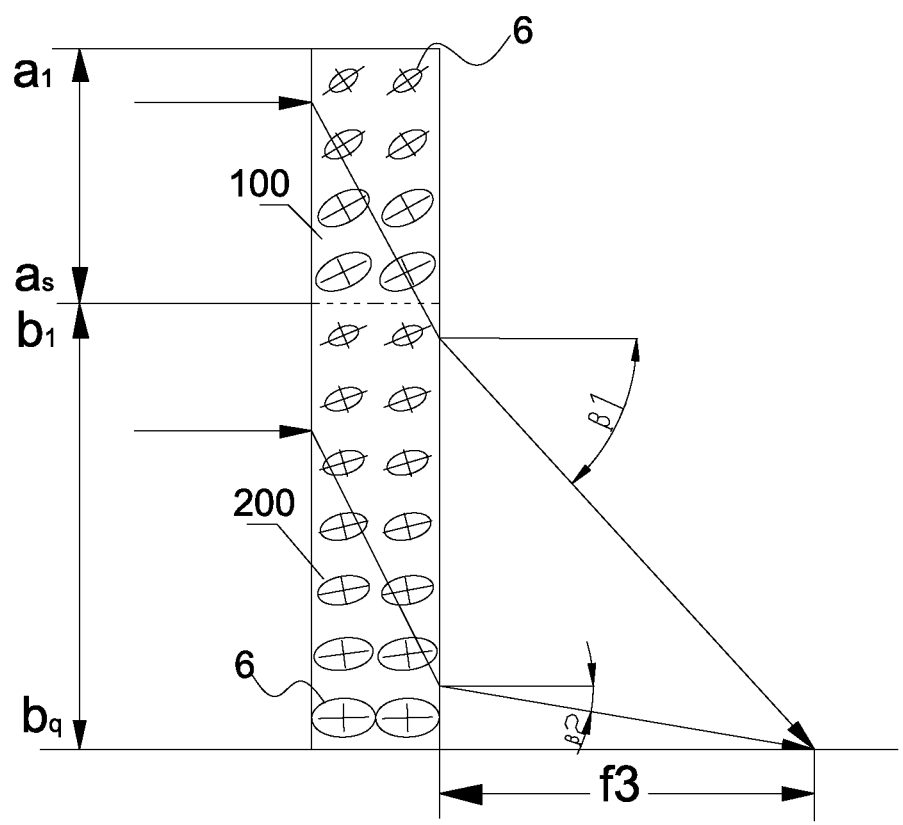
FIG. 10 is a schematic view illustrating propagation of the electromagnetic waves when the major axes of the electromagnetic wave propagating ellipsoids of the man-made microstructures in the y direction are gradually rotated incrementally.

The third metamaterial section 300 and the fourth metamaterial section 400 are preferably symmetrical with the second metamaterial section 200 and the first metamaterial section 100, with a plane that passes through a center line of a row of metamaterial units having the refractive index of $a_q$ and that is perpendicular to the surface of the metamaterial being a symmetry plane. Therefore, for simplicity of description, only the First metamaterial section 100 and the second metamaterial section 200 will be described and depicted hereinbelow, as shown in FIG. 8 to FIG. 10. These will also apply to the third metamaterial section 300 and the fourth metamaterial section 400.

II) A case in which each of the metamaterial sections has a uniform refractive index distribution and is anisotropic.

If terms in each of the relational expressions (1), (2), (3), (4) are simultaneously equal to each other respectively, then terms in each of the relational expressions (5), (6) are also simultaneously equal to each other (equal to zero) respectively. That is, both the refractive index distributions of the first metamaterial section 100 and the second metamaterial section 200 are uniform. In this case, there are three possibilities for an incident electromagnetic wave parallel to the z direction:

1) if the metamaterial sections are isotropic to the electromagnetic wave, then the electromagnetic wave will not be deflected;

2) if the metamaterial sections are anisotropic to the electromagnetic wave and optical axes thereof are perpendicular to the incident electromagnetic wave, then the electromagnetic wave will not be defected either when exiting; and 3) if the metamaterial sections are anisotropic to the electromagnetic wave and the optical axes thereof are not perpendicular to the incident electromagnetic wave, then the electromagnetic wave will be defected when exiting.

If each of the metamaterial sections has a uniform refractive index distribution but the incident direction of the electromagnetic wave is not perpendicular to the surface of the metamaterial sheet layer 1, then the electromagnetic wave will be deflected.

In order to make each of the metamaterial sections isotropic, the metamaterial units 2 within the metamaterial section must be isotropic. Further, the man-made microstructures 4 within the metamaterial section are required to be isotropic. If each of the man-made microstructures 4 is a 90° rotationally symmetrical structure, then the corresponding metamaterial unit 2 exhibits the isotropic property to the electromagnetic waves.

For a 2D structure, "90° rotationally symmetrical" means that the 2D structure will coincide with the original structure after being arbitrarily rotated by 90° about a given rotation axis perpendicular to the plane. For a 3D structure, if there are three rotation axes that are perpendicular to each other at a common intersection point so that the structure will coincide with the original structure or be symmetrical with the original structure with respect to an interface after being rotated by 90° about any of the rotation axes, then the structure is a 90° rotationally symmetrical structure. Therefore, in order to achieve the anisotropy, each of the man-made microstructures 4 of the present disclosure shall not be a 90° rotationally symmetrical structure, but can only be a non-90° rotationally symmetrical structure.

For example, the man-made microstructure 4 of the embodiment shown in FIG. 3 is a non-90° rotationally symmetrical structure, and the corresponding metamaterial unit 2 is anisotropic. For the man-made microstructure 4 of the embodiment shown in FIG. 4, if the two first metal wires are identical to and perpendicularly bisect each other and all of the second metal wires are identical to each other and are perpendicularly bisected by the respective first metal wires connected thereto, then such a man-made microstructure 4 of a 2D snowflake shape is isotropic. Similarly as shown in FIG. 5, if the three first metal wires are identical to and perpendicularly bisect each other and all of the second metal wires are identical to each other and are perpendicularly bisected by the respective first metal wires connected thereto, then such a structure of a 3D snowflake shape is also isotropic. All the man-made microstructures of the present disclosure are anisotropic.

The anisotropic material can deflect the incident electromagnetic wave when the electromagnetic wave is not perpendicular to the optical axis thereof. A refractive index ellipsoid 5 is used to represent the refractive index properties, and the size of the refractive index ellipsoid 5 represents the magnitude of the refractive index.

For any given metamaterial unit 2, the refractive index ellipsoid 5 thereof can be calculated through the simulation software and the calculation method of the prior art, for example, as described in *Electromagnetic parameter retrieval from inhomogeneous metamaterials* (D. R. Smith, D. C. Vier, T. Koschny, C. M. Soukoulis, Physical Review E 71, 036617 (2005)).

Figure 7:
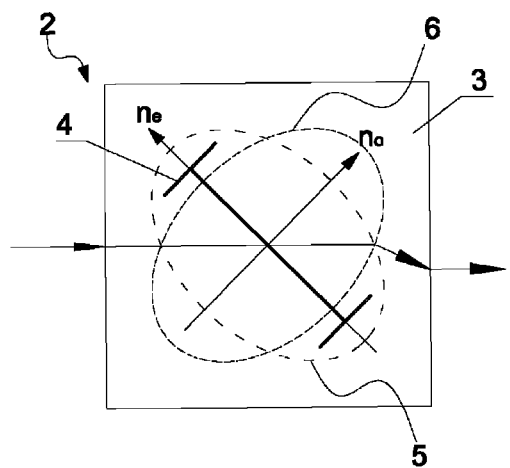
FIG. 7 is a schematic view illustrating a direction in which the electromagnetic waves propagate in the man-made microstructure.

For the metamaterial unit 2 in the embodiment shown in FIG. 3, the refractive index ellipsoid 5 thereof has an ordinary optical axis $n_e$ (briefly called an $n_e$ axis) and an extraordinary optical axis $n_o$ (briefly called an $n_o$ axis), as shown in FIG. 7. Suppose that an origin of coordinates is at a center of the refractive index ellipsoid 5, the $n_o$ axis is the x axis, the $n_e$ axis is the y axis, and any point on the refractive index ellipsoid 5 is represented by $n_x$, $n_y$. Then when the electromagnetic wave as shown in FIG. 7 propagates through the metamaterial unit 2, a wave propagating ellipsoid 6 that corresponds to the refractive index ellipsoid 5 and that is represented by $k_x$, $k_y$ has the following relationships:

$$k_y = n_x \omega/c, k_x = n_y \omega/c \quad (12)$$

where $\omega$ represents an angular frequency of the electromagnetic wave, c represents the light velocity, the wave propagating ellipsoid 6 and the refractive index ellipsoid 5 have a common center point, and $k_x$, $k_y$ are coordinates of a point on the wave propagating ellipsoid 6. As can be known from the formula, the wave propagating ellipsoid 6 has a geometry similar to that of the refractive index ellipsoid 5, and a major axis direction thereof corresponds to a minor axis direction of the refractive index ellipsoid 5 while a minor axis direction thereof corresponds to a major axis direction of the refractive index ellipsoid 5.

The deflection direction of the electromagnetic wave after propagating through the metamaterial unit 2 can be depicted by use of the wave propagating ellipsoid 6. As shown in FIG. 7, the electromagnetic wave incident in a direction as shown intersects with a point on the surface of the wave propagating ellipsoid 6 from which the electromagnetic wave is to exit, and a tangent line with respect to the wave propagating ellipsoid 6 is made at this intersection point. A normal direction of the tangent line at the intersection point is an energy propagating direction of the electromagnetic wave. Thus, the electromagnetic wave propagates in this direction within the element. The electromagnetic wave advances in this direction until exiting from the metamaterial. Then the normal line extends to intersect with the exit surface and continues to exit from the intersection point on the exit surface in a direction parallel to the incident direction. The exit direction is a phase propagating direction of the electromagnetic wave. That is, the anisotropic material can change the energy propagating direction of the electromagnetic wave without changing the phase propagating direction of the electromagnetic wave, and the electromagnetic wave is translated in direction when exiting.

III) A case in which each of the metamaterial sections has a non-uniform refractive index distribution and is anisotropic.

The premise on which the anisotropic material changes the energy propagating direction of the electromagnetic wave without changing the phase propagating direction is that, the material has a uniform refractive index distribution. For a metamaterial that has a non-uniform refractive index distribution and is anisotropic to the electromagnetic wave, both the energy propagating direction and the phase propagating direction of the electromagnetic wave will be changed after the electromagnetic wave passes through such a metamaterial. Hereinbelow, influences of the non-uniform refractive index distribution and the anisotropy on propagation of the electromagnetic wave will be illustrated with reference to three embodiments.

In the metamaterial sheet layers 1 of the three embodiments shown in FIG. 8, FIG. 9 and FIG. 10, the refractive index distributions all have the aforesaid features: the metamaterial units of each column in the y direction have refractive indices of $a_1, a_2, a_3, \ldots, a_s, b_1, b_2, b_3, \ldots, b_m, c_1, c_2, c_3, \ldots, c_p$ in sequence, and the refractive indices satisfy the relational expressions (1) to (11), with terms in each of the relational expressions (1) to (6) being not equal to each other simultaneously. Therefore, as the refractive index distributions of the three embodiments are identical to each other, the influence of the non-uniformity is the same in the three embodiments; i.e., for a same incident electromagnetic wave, the phase propagating direction thereof will be deflected by a same angle. As shown in FIG. 8 to FIG. 10, for all of the three embodiments, an electromagnetic wave propagating through the first metamaterial section in the same direction and from the same incident site has a deflection angle of β1 when exiting; and another electromagnetic wave propagating through the second metamaterial section 200 has a deflection angle of β2 when exiting.

The metamaterial units shown in FIG. 8 are all anisotropic, and the corresponding wave propagating ellipsoids 6 are as shown. In this embodiment, the minor axis of each of the wave propagating ellipsoids 6 (i.e., the extraordinary optical axis of the corresponding metamaterial unit 2) is parallel to the z direction (i.e., the incident direction of the electromagnetic wave). Therefore, the energy propagating direction of the incident electromagnetic wave is not changed, and a point to which the electromagnetic wave is converged after exiting from the metamaterial has a distance of f1 from the metamaterial.

For the metamaterial sheet layer 1 shown in FIG. 9, the man-made microstructures 4 of the metamaterial units 2 are all identical to the man-made microstructures 4 of the metamaterial units 2 in the embodiment shown in FIG. 8 in one-to-one correspondence, so the refractive index ellipsoids 5 and the wave propagating ellipsoids 6 are also identical in size and form to those of the embodiment shown in FIG. 8 in one-to-one correspondence. However, each of the man-made microstructures 4 shown in FIG. 9 is rotated clockwise by an angle θ less than 90° with respect to the corresponding man-made microstructure 4 in FIG. 8, so the minor axes of the respective wave propagating ellipsoids 6 are parallel to each other but not parallel to the z direction. The minor axes of the respective wave propagating ellipsoids 6 extend to intersect with the symmetry plane and form an acute angle larger than 0° but smaller than 90° with the symmetry plane.

As can be known from the propagating direction of the electromagnetic wave shown in FIG. 7, the energy propagating direction of the electromagnetic wave within the metamaterial sheet layer 1 will be deflected towards the symmetry plane, which is equivalent to translation of the electromagnetic wave towards the symmetry plane; and due to the variation of the refractive index, the translated electromagnetic wave will be deflected when exiting from the metamaterial sheet layer 1 (i.e., for two electromagnetic waves identical to that shown in FIG. 8, the deflection angle of the electromagnetic wave propagating through the first metamaterial section is β1 and the deflection angle of the electromagnetic wave propagating through the second metamaterial section 200 is β2). In case that the deflection angles are equal to each other, the electromagnetic waves are translated towards the symmetry plane due to the anisotropy in this embodiment, so a point to which the two electromagnetic waves identical to that shown in FIG. 8 are converged has a distance f2 from the metamaterial, which is less than the distance f1 of FIG. 8.

For the metamaterial sheet layer 1 shown in FIG. 10, the man-made microstructures 4 of the metamaterial units 2 are all identical to those in the embodiment shown in FIG. 9 in one-to-one correspondence, but the man-made microstructures 4 of the metamaterial units of each column in the y direction are rotated by an angle with respect to the corresponding man-made microstructures 4 in the embodiment shown in FIG. 9 respectively. As compared to the s+q man-made microstructures shown in FIG. 9 which have the refractive indices of $a_1, a_2, a_3, \ldots, a_s, b_1, b_2, b_3, \ldots, b_q$ and in which the minor axes of the wave propagating ellipsoids 6 are rotated clockwise by the angle θ with respect to the symmetry plane, the corresponding s+q man-made microstructures in the embodiment shown in FIG. 10 are rotated clockwise by angles $\theta_1, \theta_2, \theta_3, \theta_s, \theta_{s+1}, \ldots, \theta_{s+q-1}, \theta_{s+q}$ in sequence, and these rotation angles have the following relationships therebetween:

$$\theta_1 \leq \theta_2 \leq \theta_3 \leq \ldots \leq \theta_s \leq \theta_{s+1} \leq \ldots \leq \theta_{s+q-1} \leq \theta_{s+q} \quad (13)$$

Terms in the relational expression (13) are not equal to each other simultaneously, and $\theta_{s+q}$ is such that the minor axis of the wave propagating ellipsoid 6 of the metamaterial unit 2 corresponding to the refractive index $b_q$ is perpendicular to the z direction (i.e., the extraordinary optical axis of the corresponding refractive index ellipsoid 5 is perpendicular to or approximately perpendicular to the z direction).

As is known from FIG. 9, by clockwise rotating the wave propagating ellipsoids 6 of the anisotropic metamaterial units by the angle θ, the distance between the converging point of the electromagnetic wave and the metamaterial can be reduced. In this embodiment, because the man-made microstructures 4 are further rotated incrementally in sequence, the wave propagating ellipsoids 6 are further clockwise rotated incrementally in sequence in the y direction. Thus, within the metamaterial, the electromagnetic wave will be further deflected towards the symmetry plane each time propagating through one metamaterial unit, and these deflections together increase the equivalent translation amount of the electromagnetic wave when exiting. Therefore, provided that the phase propagating deflection angles β1, β2 caused by the non-uniform refractive indices remain unchanged, the distance from the converging point of the electromagnetic wave is further reduced to f2. Then, f1, f2 and f3 have the following relationships therebetween:

$$f1 > f2 > f3 \quad (14)$$

As can be seen from this, provided that the refractive index distributions are identical, use of the anisotropic metamaterial units 2 can reduce the distance between the converging point of the electromagnetic waves and the metamaterial (i.e., reduce the focal distance).

In other words, under conditions of identical refractive index distributions and identical focal distances, use of the metamaterial sheet layer 1 (e.g., the embodiments shown in FIG. 9 and FIG. 10) which is anisotropic and in which the extraordinary optical axes of the refractive index ellipsoids 5 are non-perpendicular to and unparallel to the symmetry plane will make the deflection angle of the electromagnetic wave smaller than the deflection angles β1, β2 in the embodiment shown in FIG. 7. As can be inferred from the relational expression (7), for the metamaterial sheet layer 1 of the former scheme, the length d thereof in the z direction is also reduced. In brief, the same converging effect is achieved. For the metamaterial sheet layers 1 shown in FIG. 9 and FIG. 10, the lengths d in the z direction are smaller than that of the metamaterial sheet layer 1 shown in FIG. 8 or the isotropic metamaterial sheet layer 1. This is advantageous in that use of materials is reduced so that the metamaterial product can be made smaller, which is favorable for achieving a lightweight and miniaturized metamaterial product.

Figure 11:
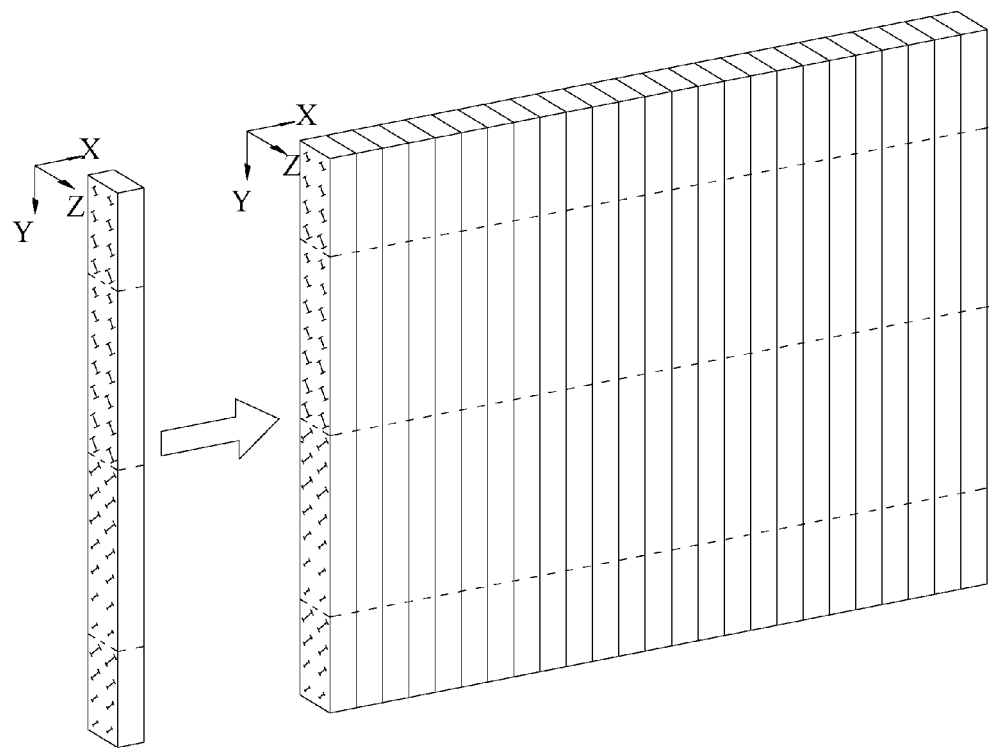
FIG. 11 is a schematic view illustrating stacking of a plurality of metamaterial sheet layers to form a metamaterial for converging electromagnetic waves.

As shown in FIG. 11, the metamaterial for converging electromagnetic waves of the present disclosure is formed by a plurality of metamaterial sheet layers 1 stacked and assembled together in the x direction. Air or a material whose dielectric constant is close to 1 and which makes no response to the electromagnetic waves is filled among the metamaterial sheet layers 1. When the number of the metamaterial sheet layers 1 is so large that the dimension in the x direction is much larger than the dimension in the z direction, the whole metamaterial may be viewed as a sheet and the dimension in the z direction is the thickness of the sheet. Thus, as can be known from the above conclusion, use of the man-made microstructures 4 which are anisotropic and which can change the energy propagating direction of the electromagnetic waves can reduce the thickness of the overall metamaterial for converging electromagnetic waves, thereby reducing consumption of the materials and achieving a lightweight, thin and miniaturized metamaterial product.

The metamaterial sheet layers 1 constituting the metamaterial may be completely identical to each other. Then, for planar electromagnetic waves, each of the metamaterial sheet layers 1 can converge a column of electromagnetic waves propagating therethrough to a point, so the plurality of metamaterial sheet layers 1 stacked in the x direction can converge the electromagnetic waves into one line parallel to the x direction.

In order to have the electromagnetic waves converged to a point, refractive index distributions of the metamaterial sheet layers are not totally the same. In the xy plane, in a second array formed by the metamaterial units that takes the x direction as a row direction and the y direction as a column direction, the refractive indices are distributed in a circular form, including at least a round distribution region and an annular distribution region that share a common center of circle. An inner diameter of the circular distribution region is substantially identical to an outer diameter of the round distribution region. The metamaterial units on a circumference of a same radius have the same refractive index. The metamaterial units from the outer diameter of the round distribution region to the center of circle in a radial direction have refractive indices of $b_1, b_2, b_3, \ldots, b_q$ in sequence. The metamaterial units from an outer diameter of the annular distribution region to the inner diameter of the annular distribution region in the radial direction have refractive indices of $a_1, a_2, a_3, \ldots, a_s$ in sequence. The metamaterial unit located at the center is a central metamaterial unit.

As can be known from the above description, a row of metamaterial units and a column of metamaterial units passing through the central metamaterial unit, and middle ones of the metamaterial units in an arbitrary straight line passing through the center of the central metamaterial unit have refractive indices of $a_1, a_2, a_3, \ldots, a_s, b_1, b_2, b_3, \ldots, b_m, c_1, c_2, c_3, \ldots, c_p$ in sequence; and the refractive indices are distributed symmetrically, i.e., satisfy the formulations (8) to (10).

In order to more intuitively represent the refractive index distribution thus obtained, the metamaterial units in the second array that have the same refractive index are connected to form a line, and the magnitude of the refractive index is represented by the density of the lines. A larger density of the lines represents a larger refractive index. The refractive index distribution of the metamaterial satisfying all of the above relational expressions is as shown in FIG. 12.

It shall be appreciated that, because each of the metamaterial units is actually a cube rather than a point, the round form and the annular form are only used to approximately describe the respective forms; and actually, the metamaterial units whose refractive indices are the same or substantially the same are located on a jagged circumference. For example, suppose that each of the metamaterial units is a cube whose side length is 1 mm, the origin of coordinates is the center point of the central metamaterial unit, and coordinates (x, y) of (3.2, 5.7) are designed to correspond to a refractive index of $n_1$ in principle. Then, the refractive index $n_1$ is actually a refractive index of a cubic metamaterial unit enclosed by four points whose coordinates are (3, 5), (3, 6), (4, 5) and (4, 6) respectively. The design process is similar to the programming process (e.g., OpenGL) for plotting points when a computer depicts a smooth curve such as a circular curve or an elliptical curve by using cubic pixel points. When the pixel points are very small relative to the curve, the curve appears to be smooth; and when the pixel points are relatively large relative to the curve, the curve appears to be jagged.

According to the above descriptions, the metamaterial of the present disclosure has the following features.

Figure 12:
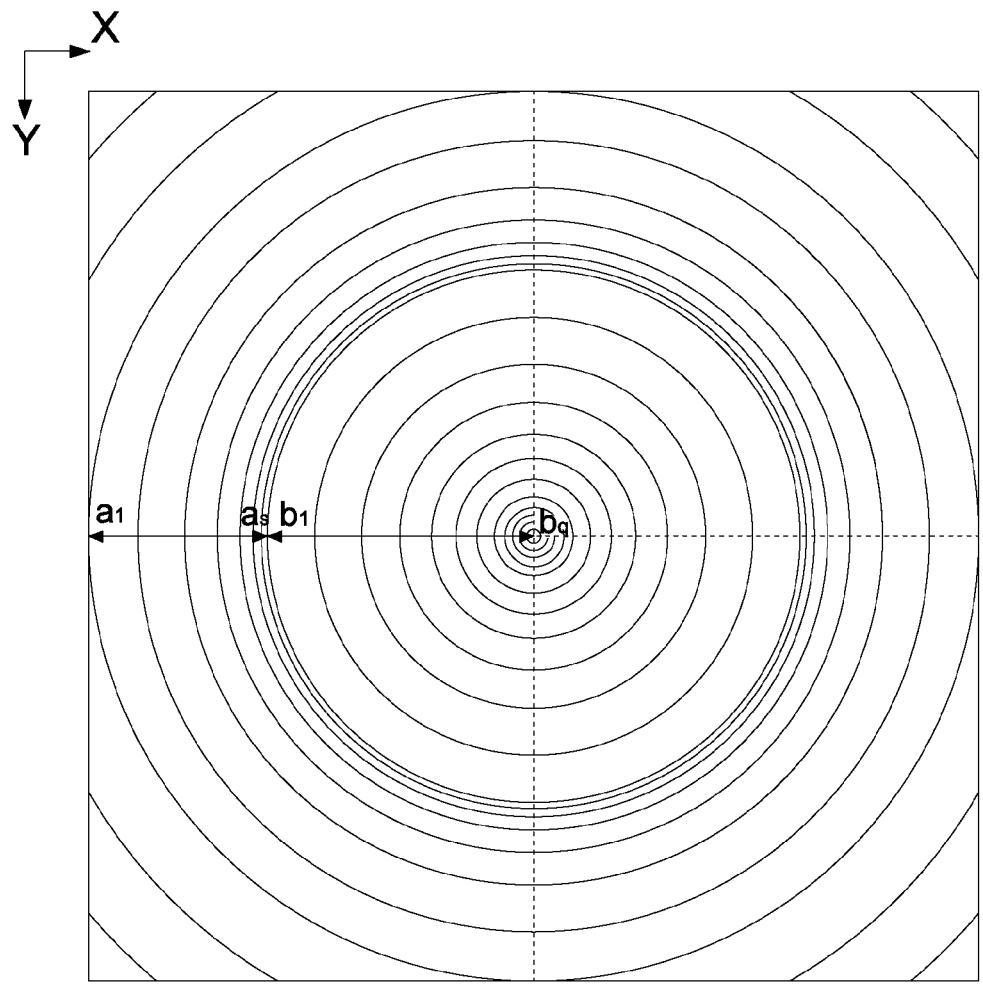
FIG. 12 is a diagram illustrating a refractive index distribution in a plane formed in an x direction and the y direction according to an embodiment.

1) The refractive index distribution in the xy plane is as shown in FIG. 12 and FIG. 13. The refractive indices in the z direction remain unchanged, so converging of electromagnetic waves can be achieved. The thickness in the z direction can be made very thin, in practice, as thin as about 2 mm~3 mm.

2) The man-made microstructures 4 on each of the metamaterial sheet layers 1 are designed to be anisotropic, and the refractive index ellipsoids 5 thereof are non-perpendicular to and unparallel to the z direction. This can deflect the energy propagating direction of the electromagnetic waves towards the middle within the metamaterial so as to reduce the focal distance of the electromagnetic waves when exiting, thereby narrowing the propagating scope. In other words, the same converging effect is achieved, and use of the anisotropic man-made microstructures 4 allows the metamaterial product to be made thinner.

3) The man-made microstructures 4 in the y direction are rotated in sequence, and this can further increase the translation amounts of the electromagnetic waves within the metamaterial so as to reduce the focal distance or similarly reduce the thickness d of the metamaterial product.

In actual applications, when the size, the position and the focal distance of the metamaterial as well as the propagation properties of the incident electromagnetic waves are determined for a given application environment, the deflection angle of the electromagnetic wave passing through each of the metamaterial units 2 of the metamaterial may be calculated firstly; then, a difference $\Delta$ in refractive index between two adjacent metamaterial units is calculated according to the formula (7); and finally, the distribution of the refractive indices n of the metamaterial units in the x direction and the y direction can be reversely solved through differentiation and integration.

As the refractive index is determined by both the dielectric constant and the magnetic permeability, the refractive index may be adjusted by changing the dielectric constant so as to achieve different refractive index distributions of the electromagnetic waves in the xy plane. By changing the shape and the size of each of the man-made microstructures 4, the dielectric constant of the corresponding metamaterial unit 2 can be changed so as to change the refractive index. For example, by changing the lengths of the first metal wires and the second metal wires of the man-made microstructures 4 shown in FIG. 3, FIG. 4 and FIG. 5, the dielectric constants of the corresponding metamaterial units 2 can be changed.

For the man-made microstructures 4 having the same geometry, the refractive indices of the corresponding metamaterial units 2 increase as sizes of the man-made microstructures 4 increase. As the refractive indices remain unchanged in the z direction, the man-made microstructures 4 of the metamaterial units of each row in the z direction may be designed to be completely identical to each other.

The conventional metamaterial converges the electromagnetic waves by gradually increasing the refractive indices in the y direction and/or the x direction to a maximum value and then gradually decreasing the refractive indices. However, the sizes of each of the man-made microstructures 4 is limited by the corresponding substrate unit, and the dimension of the substrate unit must be within one fifth of the wavelength of the incident electromagnetic waves in order for responses of the metamaterial units to the electromagnetic waves to be continuous. Thus, the maximum dimension of each of the man-made microstructures 4 can only be one fifth of the wavelength of the incident electromagnetic waves, and the refractive index of the man-made microstructure 4 in this case is also limited. If the maximum value to which the refractive index is gradually increased is larger than the refractive index in this case, it would be impossible to achieve the converging purpose.

The deflection angle of the electromagnetic waves is associated with the refractive index variation of the metamaterial in the y direction but not with the value of the refractive index itself. Therefore, the present disclosure is inventive in that: the first metamaterial section to the fourth metamaterial section which provide a multi-stage refractive index distribution are adopted to achieve converging of electromagnetic waves. Through variations in refractive index of the metamaterial sections in the y direction, deflection angles that allow for converging of the electromagnetic waves can be obtained. On the other hand, because the values of the refractive indices themselves are always kept within a range (e.g., the maximum values $a_s$, $b_q$ and the minimum values $a_1$, $b_1$ of the refractive indices $a_1, a_2, a_3, \ldots, a_s$ of the first metamaterial section in the y direction and the refractive indices $b_1, b_2, b_3, \ldots, b_q$ of the second metamaterial section in the y direction are equal to each other respectively), the problem that the metamaterial product cannot be manufactured due to excessively large values of the refractive indices is avoided.

Meanwhile, under conditions that the metamaterial is of a given size and both the maximum values and the minimum values of the refractive indices are equal to each other, the metamaterial of the present disclosure adopts four metamaterial sections each having a maximum refractive index and a minimum refractive index. However, the refractive indices of the conventional metamaterial only have two variation sections in which the maximum refractive index and the minimum refractive index are reached in sequence respectively. Therefore, the average variation rate of the refractive indices of the present disclosure is twice that of the conventional metamaterial, and the deflection angles of the electromagnetic waves are much larger than those of the conventional metamaterial, so the focal distance is shortened. In other words, if a same focal distance is to be achieved, then the metamaterial of the present disclosure will have a reduced thickness, which is favorable for achieving a miniaturized and lightweight metamaterial product.

Accordingly, the embodiments of the present disclosure have been described above with reference to the attached drawings; however, the present disclosure is not limited to the aforesaid embodiments, and these embodiments are only illustrative but are not intended to limit the present disclosure. Those of ordinary skill in the art may further devise many other implementations according to the teachings of the present disclosure without departing from the spirits and the scope claimed in the claims of the present disclosure, and all of the implementations shall fall within the scope of the present disclosure.

What is claimed is:

1. A metamaterial comprises a plurality of metamaterial sheet layers stacked integrally in an x direction, each of the metamaterial sheet layers comprises a plurality of metamaterial units, each of the metamaterial units has an identical substrate unit and a man-made microstructure attached on the substrate unit, the metamaterial units being arranged into a first array which takes a y direction perpendicular to the x direction as a column direction and a z direction perpendicular to both the x direction and the y direction as a row direction, wherein:

the metamaterial units of each row have a same refractive index, the metamaterial units of each column have refractive indices of $a_1, a_2, a_3, \ldots, a_s, b_1, b_2, b_3, \ldots, b_m, c_1, c_2, c_3, \ldots, c_p$ in sequence, and the refractive indices satisfy:

$a_1 \leq a_2 \leq a_3 \ldots \leq a_s, c_1 \geq c_2 \geq c_3 \ldots \geq c_p$; where $b_1 < a_s$, $b_m < c_1$, s and p are both natural numbers no less than 2, and m is a natural number no less than 1; and the man-made microstructure is a non-90° rotationally symmetrical structure, and the extraordinary light optical axis of each microstructure's refractive index ellipsoid thereof is neither perpendicular nor parallel to the y direction.

2. The metamaterial of claim 1, wherein the $b_1, b_2, b_3, \ldots, b_m$ have the following relationships therebetween:
$b_1 \leq b_2 \leq b_3 \ldots \leq b_q$, $b_q \geq b_{q+1} \geq b_{q+2} \geq b_{q+3} \ldots \geq b_m$, and q is a natural number that is less than m.

3. The metamaterial of claim 2, wherein the refractive indices of the metamaterial units of each column also have the following relationships therebetween:

$$(a_2-a_1) \geq (a_3-a_2) \ldots \geq (a_s-a_{s-1}) \geq (b_2-b_1) \geq (b_3-b_2) \ldots \geq (b_{q-1}-b_q),$$

$$(b_q-b_{q+1}) \leq (b_{q+1}-b_{q+2}) \leq (b_{q+2}-b_3) \ldots \leq (b_{m-1}-b_m) \leq (c_1-c_2) \leq (c_2-c_3) \leq (c_{p-1}-c_p).$$

4. The metamaterial of claim 3, wherein the refractive indices also have the following relationships:

$$a_1=b_1=b_m=c_p, a_s=b_q=c_1, s=p, q>s \text{ and } q>p, q=[(m+1)/2].$$

5. The metamaterial of claim 4, wherein for the man-made microstructures of the metamaterial units of each column in the y direction, the extraordinary optical axes of the respective refractive index ellipsoids are rotated in the clockwise direction sequentially, and the extraordinary optical axes of the refractive index ellipsoids of one of the rows of the man-made microstructures that has the refractive index of $b_q$ are parallel to the y direction.

6. The metamaterial of claim 5, wherein the plurality of metamaterial sheet layers are identical to each other and have the same refractive index distribution as each other.

7. The metamaterial of claim 5, wherein the plurality of metamaterial sheet layers have different refractive index distributions from each other, and for each second array formed by the metamaterial units that takes the x direction as a row direction and the y direction as a column direction, a central metamaterial unit is taken as a circle center, and refractive indices of a row of metamaterial units and a column of metamaterial units passing through the central metamaterial unit are $a_1, a_2, a_3, \ldots, a_s, b_1, b_2, b_3, \ldots, b_m, c_1, c_2, c_3, \ldots, c_p$ in sequence.

8. The metamaterial of claim 7, wherein the refractive indices of the second array are distributed in a circular form, and the refractive indices of at least some of the metamaterial units in an arbitrary straight line passing through the circle center are $a_1, a_2, a_3, \ldots, a_s, b_1, b_2, b_3, \ldots, b_m, c_1, c_2, c_3, \ldots, c_p$ in sequence.

9. The metamaterial of claim 1, wherein the man-made microstructures have substantially the same geometry but sizes thereof increase as the refractive indices increase or decrease as the refractive indices decrease.

10. The metamaterial of claim 1, wherein the man-made microstructures are of an "I" shape or two "I" shapes which perpendicularly bisect each other.

11. The metamaterial of claim 10, wherein the man-made microstructures are made of a metal material.

12. The metamaterial of claim 1, wherein the man-made microstructures in each column in the y direction are rotated clockwise or counterclockwise in sequence respectively from a middle metamaterial unit towards two ends of the column, and the man-made microstructures of the metamaterial units located at the two ends are rotated by no more than 90° with respect to the man-made microstructure of the middle metamaterial unit.

13. The metamaterial of claim 12, wherein clockwise rotation angles of the man-made microstructures of each column in the y direction are $\theta_1, \theta_2, \theta_3, \ldots, \theta_q$ in sequence, and have the following relationships therebetween:

$$\theta_1 \leq \theta_2 \leq \theta_3 \leq \ldots \leq \theta_q.$$

14. The metamaterial of claim 1, wherein dimensions of each of the metamaterial units including the man-made microstructure in the x direction, the y direction and the z direction range between one fiftieth and a half of a wavelength of a target electromagnetic wave.

* * * * *